March 12, 1940.  F. H. HAGNER  2,193,512
OBSERVATION INSTRUMENT
Filed June 25, 1937
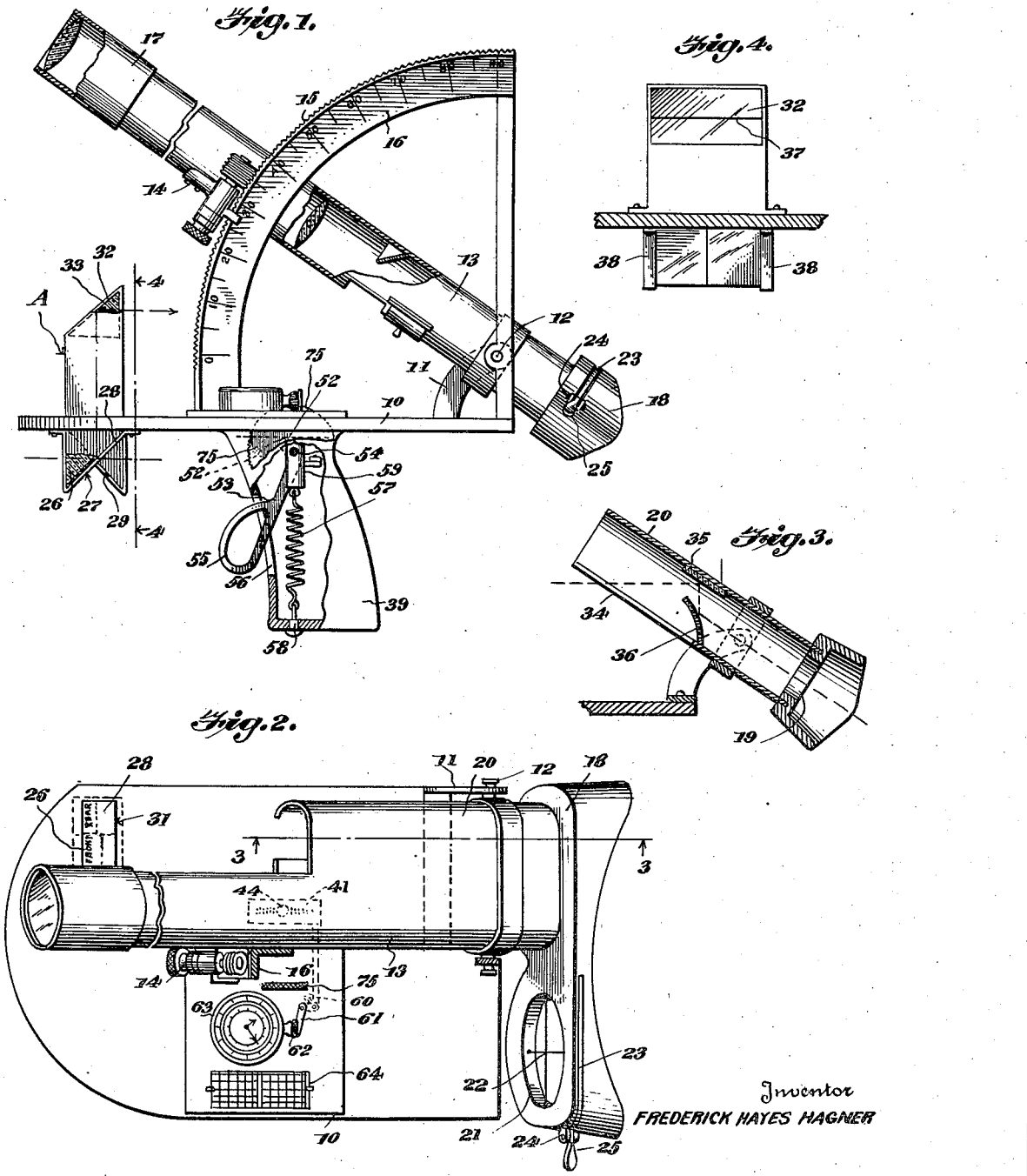
Inventor
FREDERICK HAYES HAGNER Patented Mar. 12, 1940

2,193,512

UNITED STATES PATENT OFFICE 2,193,512

OBSERVATION INSTRUMENT

Frederick Hayes Hagner, San Antonio, Tex., assignor to Archbold-Hagner Instrument Laboratory, Inc., a corporation of Delaware Application June 25, 1937, Serial No. 150,413

4 Claims. (Cl. 88—2.2)

This invention relates to an observation instrument and has for one of its objects the production of an instrument for measuring the angle of a selected celestial body with respect to a horizontal line, by direct observation of the selected celestial body.

A further object of this invention is the production of a simple and efficient means for observing and checking the forward and rear horizons with respect to an observer by means of reflecting observation.

Other objects and advantages of the present invention will appear throughout the following specification and claims.

In the drawing:

Figure 1 is a side elevation of the observation instrument;

Figure 2 is a top plan view thereof;

Figure 3 is a longitudinal sectional view taken on line 3—3 of Figure 2;

Figure 4 is a vertical section taken on line 4—4 of Figure 1.

By referring to the drawing, it will be seen that 10 designates a platform which may be of any shape desired to suit the convenience of the instrument, which platform carries an upstanding bracket 11 upon which is pivotally secured, as at 12, a telescope 13. The telescope 13 carries a micrometer adjustment screw 14 of suitable type which meshes with a toothed rack 15 on a quadrant scale 16 which scale extends in an upright position or is supported in a vertical plane upon the platform 10, as is shown in Figure 1. The telescope 13 may be provided with a suitable focusing lens 17 at its outer end and the telescope 13 may be of suitable construction to perform the desired function and be provided with the usual telescopic lens arrangement.

The telescope 13 carries at its inner end a hood 18 having an elongated sight opening 19 which connects with the inner end of the telescope 13 and also with the inner end of the horizon observing extension housing 20, which extension 20 forms a part of, and a lateral extension of, the telescope 13 as is clearly shown in Figure 2. The hood 18 carries at its opposite side a sight opening 21 for accommodating the opposite eye of the observer and in this sight opening 21 are provided cross wires 22 whereby an observer may facilitate the location of a selected celestial body and facilitate the spotting of the telescope 13 upon the desired selected celestial body. A shutter gate 23 is pivotally secured, as at 24, upon the hood 18, and carries a thumb or finger piece 25 whereby the shutter gate may be swung away from or over the sight opening 21 when desired. This shutter gate 23 preferably constitutes a light filter for use particularly in observing the sun. The hood 18 is also formed as to comfortably fit against the forehead and over the eyes of the observer and may be of any suitable or convenient design.

The platform 10 carries near its forward end and to the right of the telescope 13 and in substantial horizontal alignment with the extension housing 20 a periscopic device for projecting the image of the forward and rear horizons. This periscopic device comprises a mirrored prism 26 secured to the under face of the platform 10 and having its mirrored angular face 27 in a forward direction. Placed to the side of the mirrored prism 26 is a second or rear horizon viewing prism 28 having its inclined face 29 mirrored and facing rearwardly. The platform 10 is apertured directly above the mirrors 26 and 28 and the periscopic device comprises also an upstanding housing 30 located directly over the aperture 31 formed in the platform 10 directly above the prisms 26 and 28. The upper end of this housing 30 carries a prism 32 having its inclined face 33 mirrored and facing toward the inner end of the telescope 13 and necessarily in alignment with the open under face 34 of the extension housing 20 of the telescope 13. The housing 20 carries against its upper inner face a reflecting mirror 35 properly located to reflect front and rear horizons from the prism 32. A convex mirror 36 of suitable construction is located substantially below the mirror 35 properly positioned and spaced therefrom to reflect the image from the mirror 35 and permitting the eye of the observer to view the horizon reflected upon the mirror 36 through the sight opening 19. The prism 26 is preferably marked with a line 37 transversely as a gage line constituting the horizontal upon which the horizon lines are to register and the prisms 26 and 28 are preferably marked "F" and "R" or "Front" and "Rear" respectively, so that the observer may easily distinguish the front from the rear horizons and adjust the instrument accordingly.

By means of the device described and illustrated an observer may sight a selected celestial body through the telescope and at the same time also by observing the front and rear horizons through the medium of the periscopic device indicated by the letter A in Figure 1 properly adjust the position of the platform 10 to bring the lines of the forward and rear horizons into proper alignment and in registration with the gage line 37 preferably formed on the reflecting face 33 of the prism 32. In this way, the observer will know that he has spotted the selected celestial body through the telescope and when the two lines of the horizon are in registration with the line 37, he will also know that the instrument is substantially level it being of course obvious that the cross wires in the telescope 13 are centered upon the object observed, the prisms 26 and 29 may be supported by suitable hanger frames 38, such as is shown in Figure 4, and any suitable supporting means may be employed without departing from the spirit of the invention.

The platform 10 carries a hand-grip portion 39 which is suspended below the same in a convenient location whereby the observer may grip the grip portion 39 with his right hand and rest his hand against his cheek bone or front portion of his face directly below the right eye in this way supporting the instrument conveniently and comfortably without strain.

Having described the invention, what I claim as new is:

1. An observation instrument of the class described comprising means for directly observing a selected celestial body, means located adjacent the first mentioned means for viewing simultaneously a forward horizon directly under the observed selected celestial body and a rear horizon 180 degrees therefrom, said last mentioned means comprising a pair of oppositely faced reflecting prisms arranged in substantially transverse alignment, a reflecting prism in vertical alignment with respect to both of said first mentioned prisms and within sight of an observer while viewing the celestial body, said first mentioned means being adjustable and having a measuring device associated therewith for determining the angle of the first mentioned means when viewing the celestial body, said first mentioned means having means for reflecting an image from said reflected prism to a point where the said image may be seen by an observer, and the said second mentioned means having a gage line therein with which forward and rear horizons are adapted to register to permit an observer to determine whether or not the instrument is level.

2. An observation instrument of the class described comprising means for directly observing a selected celestial body, means adjacent the first mentioned means for viewing simultaneously a forward horizon directly under the observed selected celestial body and a rear horizon 180 degrees therefrom, said last mentioned means comprising a pair of oppositely faced reflecting prisms arranged in substantially transverse alignment, and a reflecting prism in vertical alignment with respect to both of said first mentioned prisms and within sight of an observer while viewing the celestial body through the first mentioned means, said first mentioned means being adjustable and having a measuring device associated therewith for determining the angle of the first mentioned means when viewing the celestial body, reflecting means carried by the first mentioned means for reflecting an image from said reflecting prism whereby an image of the forward and rear horizons may be simultaneously viewed while observing a celestial body, and the said second mentioned means having a gage line therein with which forward and rear horizons are adapted to register to permit an observer to determine whether or not the instrument is level.

3. An observation instrument of the class described comprising a support, a telescope adjustably mounted thereon, a measuring quadrant, means for adjusting said telescope upon the measuring quadrant, an indicating scale on the measuring quadrant to indicate the angular position of said telescope, said telescope constituting means for directly observing a selected celestial body, means for simultaneously viewing a forward horizon under the selected celestial body and a rear horizon 180 degrees therefrom, and means carried by the telescope for reflecting an image of the forward and rear horizons to the eyes of an observer from said last mentioned means while using said telescope.

4. An observation instrument of the class described comprising a support, a telescope adjustably mounted thereon, a measuring quadrant, means for adjusting said telescope upon the measuring quadrant, an indicating scale on the measuring quadrant to indicate the angular position of said telescope, said telescope constituting means for directly observing a selected celestial body, means for simultaneously viewing a forward horizon under the selected celestial body and a rear horizon 180 degrees therefrom, and reflecting means carried by the telescope for reflecting an image of the forward and rear horizons to the eyes of an observer from the last mentioned means, simultaneously with the use of the telescope.

FREDERICK HAYES HAGNER.